United States Patent [19]

Itou et al.

[11] 3,734,449

[45] May 22, 1973

[54] METAL MOLD FOR INJECTION MOLDING

[75] Inventors: Moriyuki Itou, Iwatsuki-shi, Saitama-ken; Takashi Aoba, Ageo-shi, Saitama-ken, both of Japan

[73] Assignee: Tokyo Shibaura Electric Co., Ltd., Kawasaki-shi, Japan

[22] Filed: Aug. 6, 1971

[21] Appl. No.: 169,785

[30] Foreign Application Priority Data

Oct. 14, 1970 Japan..........................45/101398

[52] U.S. Cl. ...................249/114, 249/134, 425/470
[51] Int. Cl...............................................B29c 1/02
[58] Field of Search.............................425/117, 470; 249/116, 135, 114, 134; 264/338; 164/123

[56] References Cited

UNITED STATES PATENTS

| 2,390,373 | 12/1945 | Jones et al | 249/201 |
| 3,072,981 | 1/1963 | Davidson | 249/201 X |
| 3,204,917 | 9/1965 | Richards | 249/116 |

Primary Examiner—R. Spencer Annear
Attorney—Kenon, Palmer & Estabrook

[57] ABSTRACT

A metal mold for the injection molding, characterized in that a plastic piece being lower in thermal conductivity than the base metal of said metal mold is provided to form at least a part of the inside of said metal mold, and that a metal plating layer is deposited on the exposed surface of said plastic piece.

2 Claims, 1 Drawing Figure 3,734,449
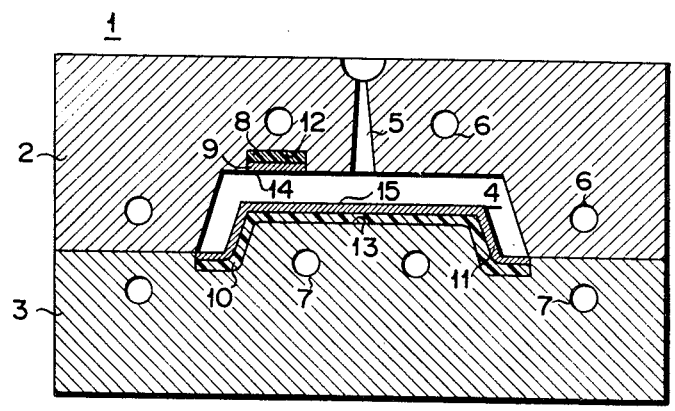

METAL MOLD FOR INJECTION MOLDING

The present invention relates to a metal mold for injection molding, and more particularly to a metal mold which imparts luster to the surface of an injection-molded article of a thermoplastic resin.

In the injection molding of thermoplastic resins such as polystyrene and polypropylene, it is known that the luster of a molded article varies dependent upon the temperature of the metal mold. As the temperature of the metal mold is higher, the luster will become better.

In case where a molded article of a low-expansion foaming resin is molded by the injection molding, when a substance of a lower thermal conductivity in comparison with that of the base metal of the metal mold is interposed at the inner surface of the metal mold, that surface of the molded article which corresponds to the substance portion exhibits a decrease in the appearance of a whitish form pattern and is colored somewhat closer to the ground or base color of the resin to be distinguished from the foamed pattern other than it.

It is impossible, however, to make the surface have substantially the same color as the ground color of the resin and to impart a sufficient luster thereto.

An object of the present invention is to provide a metal mold for injection molding, in which the inside thereof is held at a higher temperature locally or over the entire area during molding.

Another object of the present invention is to provide a metal mold which imparts luster to part or the whole of the surface of an injection-molded article consisting of usual thermoplastic resins.

Still another object of the present invention is to provide a metal mold which causes a lustrous ground color of a resin to appear on part or the whole of the surface of an injection-molded article consisting of low-expansion foaming thermoplastic resins.

More specifically, the present invention is constructed such that, at the inside of a metal mold for the injection molding, a layer of a substance lower in thermal conductivity than the base metal of the metal mold, i.e., of a resin, is deposition-formed at least at part of the inside of the metal mold, that a thin metal plating layer is provided on the resin layer to thus form a composite layer, and that the surface of the composite layer is made a metal-mold surface, i.e., a surface at which the metal mold and a material resin are held in contact. When the material resin in the molten state flows into the metal mold, the metal plating layer is rapidly heated under the action of heat insulation of the layer of the substance having a lower thermal conductivity, to temporarily raise the temperature of the inside of the metal mold, thereby more enhancing the luster of a molded article.

The present invention can be more fully understood from the following detailed description when taken in conjunction with reference to the appended drawing, in which:

The single FIGURE is a longitudinal section which shows a metal mold embodying the present invention.

When a metal mold of the present invention is applied to the molding of a molded article of a low-expansion foaming resin, that surface of the molded article which corresponds to a composite layer consisting of a layer of a substance of a lower thermal conductivity and a plated layer presents a color phase extremely close to the ground or base color of the resin, and therewith, it becomes a lustrous surface. Accordingly, in the case where the entire inner surface of the metal mold is formed into the composite layer of the present invention, even if a low-expansion foaming resin is employed, there may be obtained a molded article whose surface has an external appearance substantially the same as in the use of usual resins and exhibits luster while its inner part is of a foamed structure.

According to the metal mold of the present invention, it is presumed, at the injection molding, the metal plating layer is temporarily brought into the heat-insulated condition and is maintained at a high temperature, and thus the smooth surface thereof adheres sufficiently closely to a molten material resin, so that the luster of the corresponding surface of the injection-molded article may be improved. While conditions for attaining a good luster vary dependent upon the resin employed and are controlled by the thickness of the resin layer of a lower thermal conductivity, they may be determined by experiments so as to accomplish the best results without substantially lengthening the molding time.

For the resin smaller in the thermal conductivity relative to the base material of the metal mold as is used in the present invention, there may be used an epoxy resin, a polyethylene terephthalate resin, an acrylonitrile-butadienestyrol resin, a phenol-formaldehyde resin, and other resins. The thickness of the resin layer is selected at approximately 0.3 to 1 mm. For the metal to be plated on the resin layer, there may be used nickel, chromium, cadmium, gold, silver, tin, and the like. In case where it is difficult to plate the metals directly on the resin layer, a rigid plating layer is attainable through interposition of a plating layer of other metals.

In the accompanying drawing, a metal mold 1 consists of a female mold or cavity 2 and a male mold or core 3 engaged therewith. Between the cavity 2 and the core 3, a molding void portion 4 is defined. The cavity 2 is provided with a sprue 5 through which a molten material resin is supplied at molding, while the cavity 2 and the core 3 are respectively formed with a plurality of circulation holes 6 and 7 for a cooling medium. The present invention disposes, on the inside of such metal mold, a composite layer which consists of a layer of a substance lower in thermal conductivity than the base metal of the metal mold and a plated layer. In the illustrated embodiment, the composite layer consisting of the above-mentioned substance layer 8 and the metal plating layer 9 is provided at part of the inside of the molding void portion of the cavity 2, while the composite layer consisting of the substance layer 10 and the metal plating layer 11 is disposed on the entire area of the inside of the molding void portion of the core 3. In order to provide such composite layers, in case of the cavity 2, a concave place 12 is perforated in the inside thereof, the layer 8 of, e.g., epoxy resin is deposited on the bottom surface of the concave place 12, and then, the metal plating layer 9 is formed on the epoxy-resin layer 8. On the other hand, in case of the core 3, the inside is formed into a surface 13 which is lower than the completed inner surface by a thickness of the composite layer consisting of the resinous layer 10 and the metal plating layer 11. In case where the resinous layer is thin, said resinous layer and the plated layer may be formed on the lower-level surface 13. In case where the resinous layer is relatively thick, a separate cavity as forms between it and the lower-level surface 13 a void portion corresponding to the resinous layer 10 is previously prepared, the epoxy resin, by way of example, may be filled into the void portion to deposit the resinous layer, and then, the plated layer may be formed. Thus, in the illustrated embodiment, a surface 14 of the composite layer of the cavity 2 constitutes part of the cavity surface, while a surface 15 of the composite layer of the core 3 provides the whole core surface.

The depths of the concave place and the lower-level surface provided at the inside of the metal mold of the present invention may be, in actuality, selected equal to the respective thicknesses of the resinous layers only, since the metal plating layers are thin. In case where the resinous layer is disposed at part of the inside of the metal mold, the metal plating layer may be provided not only on the resinous layer, but also commonly on other areas of the metal-mold surface without hindrance. With such metal plating layer, the surface of the metal mold may be advantageously protected from corrosion and abrasion.

Description will now be made of actual examples of the new molds the present invention and their uses.

EXAMPLE 1

In a metal mold made of steel which consisted of female and male molds having a void portion of 80 mm in diameter and 3 mm in depth, a concave portion of 10 mm in diameter and 0.3 mm in depth was perforated in the circular bottom surface of the female mold or cavity, and an epoxy-resin film approximately 0.3 mm thick was caused to adhere into the concave portion to cover it.

The covering surface of the epoxy-resin film was repeatedly washed with an aqueous solution of caustic soda, water, hydrochloric acid, and water. Thereafter, using CUPPEY MIXS SOLUTION (tradename) which is a copper electrolessplating solution produced by Shipley Co. and containing an aqueous solution of copper sulfate as its main constituent, a copper electrolessplating layer 10 $\mu$ thick was formed. Then, using an aqueous solution having the composition of 210 g/l of copper sulfate and 60 g/l of sulfuric acid and under the conditions of a current density of 2 Amp./dm$^2$, a specific gravity of 1.2 and a temperature of the solution of 50°C, a copper electroplating layer 0.01 mm thick was deposited on the said electrolessplating layer.

A nickel electroplating layer having a thickness of 0.01 mm was formed onto the copper electroplating layer, using a nickel-plating aqueous solution having the composition of 300 g/l of nickel sulfate, 50 g/l of nickel chloride, 50 g/l of boric acid and 0.5 g/l of gelatin and under the conditions of a current density of 3 Amp./dm$^2$, pH 5.0 and a temperature of the solution of 40° to 50°C.

This metal mold was pre-heated to 40°C, and with a styrol resin which is known under the tradename of DIAREX HT-88A (produced by Mitsubishi-Monsanto Chemical Co., Ltd.), the injection molding was carried out at a cylinder temperature of 200°C and under an injection pressure of 1,000 kg/cm$^2$. One side of a molded disc obtained, presented a very lustrous external appearance.

EXAMPLE 2

In a metal mold made of steel which consisted of a cavity and a core defining a void portion of 80 mm in diameter and 3 mm in depth, a concave portion of 10 mm in diameter and 0.5 mm in depth was carved into part of the inside of the core, and an epoxy resin was filled and deposited into the concave portion. Over the entire area of the core inside including the deposited epoxy-resin layer, there were successively formed a copper electrolessplating layer 0.008 mm thick, a copper electroplating layer 0.01 mm thick and a nickel electroplating layer 0.01 mm thick in the treating order mentioned in Example 1. Thereafter, using an aqueous solution of the composition of 200 g/l of chromium sulfate, 240 g/l of urea and 396 g/l of ammonium sulfate and under the conditions of a current density of 35 Amp./dm$^2$, pH 2.5 and a temperature of the solution of 45°C, treatment was done to form a chrome electroplating layer 0.02 mm thick on the nickel plating layer.

Using this metal mold, the injection molding was carried out with the styrol resin mentioned in Example 1 and in conformity with the process in Example 1. A lustrous, small circle was clearly observed on one side of a molded disc obtained.

EXAMPLE 3

Herein explained is a case where, in the metal mold of Example 2, on the nickel electroplating layer there was disposed a cadmium plating layer instead of the chrome plating layer.

Treatment was done using an aqueous solution of the composition of 25 g/l of cadmium sulfate, 130 g/l of sodium cyanide and 35 g/l of caustic soda and under the conditions of a current density of 1.5 Amp./dm$^2$, a voltage of 10 V and a temperature of the solution of 25°C, and a cadmium electroplating layer 0.02 mm thick was formed on the nickel plating layer.

With the above metal mold, the injection molding was performed in accordance with the process in Example 1 by applying a low-magnification foaming plastic material which was made up such that, to a styrol resin with DIAREX HT-88A and DIAREX HF-77 (both being tradenames and being produced by Mitsubishi-Monsanto Chemical Co., Ltd.) compunded by equal parts, 1 percent of diazo-carbon amide as a foaming agent and 3 percent of Dai-Nippon-Ink-Dairen Color SP 705 (tradename, produced by Dai-Nippon Ink and Chemicals, Inc.) as a pigment were respectively mixed. On one side of a molded disc obtained, a small circle of a lustrous ground color of the resin appeared as part of a whitish foamed pattern, and was clearly distinguishable.

EXAMPLE 4

In a metal mold made of a beryllium-copper alloy which had a void portion of 75 mm in diameter and 3 mm in depth, a heart-shaped concave portion being approximately 10 mm in both height and width and being 3 mm in depth was perforated in a part of the inside of a cavity. A molded article of an acrylonitrile-butadiene-styrol resin which had a configuration conforming to the above shape was made, and it was fitted to the concave portion and was secured with an epoxy-resin bonding agent. The surface of the resinous covering was treated by the process stated in Example 1, and a nickel electroplating layer was formed on a copper electrolessplating layer. Subsequently, a gold electroplating layer 0.01 mm thick was formed on the nickel electroplating layer, using an aqueous solution of the composition of 2.5 g/l of gold, 12.0 g/l of sodium cyanide and 15.0 g/l of sodium phosphate and under the conditions of a current density of 0.5 Amp./dm², a voltage of 2 V and a temperature of the solution of 65°C.

Using this metal mold, a low-expansion foaming resin was injection-molded at a cylinder temperature of 210°C, under an injection pressure of 900 kg/cm² and at a metal-mold temperature of 50°C, said low-expansion foaming resin being made up such that, to a polystyrol resin known as DIAREX HT-88A (refer to Example 1), 3 percent by weight of benzene-sulfonyl hydrazide as a foaming agent and Dai-Nippon-Ink-Dairen Color SP 705 (refer to Example 3) as a pigment were respectively mixed.

On one side of a molded disc obtained, a heart pattern of a dark ground color was distinctly embossed.

EXAMPLE 5

A metal mold was prepared in which, in the metal mold of Example 4, in place of the molded article of the acrylonitrile-butadiene-styrol resin a molded article of a phenolformaldehyde resin was secured to the heart-shaped concave portion, and in place of the gold plating layer, a silver plating layer was formed.

Treatment was carried out using an aqueous solution for a silver plating solution and which had the composition of 5 g/l of silver cyanide, 4.0 g/l of silver nitrate, 18.5 g/l of potassium cyanide, 13 g/l of free potassium cyanide and 15 g/l of potassium carbonate, and under the conditions of a current density of 0.2 Amp./dm², a voltage of 3 V and a solution temperature of the normal temperature. Thus, a silver electroplating layer 0.015 mm thick was formed on the nickel electroplating layer.

With the above metal mold, the injection molding as performed at a cylinder temperature of 230°C, under an injection pressure of 1,000 kg/cm² and at a metal-mold temperature of 50°C by applying a low-expansion foaming resin which was made up such that 1 percent by weight of diazo carbon amide was mixed as a foaming agent to an acrylonitrile-butadiene-styrol resin known under the tradename of SUMITOMO-KRALASTIC MH (produced by Sumitomo Chemical Co., Ltd.).

On a molded article obtained, there was observed a lustrous heart-shaped pattern as in Example 4.

EXAMPLE 6

In order to represent characters of the ground color of a plastic material on a front decoration panel (dimensions: 80 mm × 350 mm) of a cabinet for a television receiving set, a metal mold was manufactured as follows:

In part of the inside of a cavity of a metal mold of steel for the decoration panel, characters were carved to a depth of 0.6 mm. A polyethylene terephthalate resin was filled into a concave portion thus formed. The surface of the filled resin was shaved to become coplanar with the inside, and the exposed surface was polished. Over the entire area of the cavity inside including the resin layer, a copper electrolessplating layer and a nickel electroplating layer were successively deposited in accordance with the process of Example 1. A tin electroplating layer was formed on the nickel plating layer, using an aqueous solution of the composition of 101 g/l of sodium stannate and 10.6 g/l of caustic soda and under the conditions of a current density of 10 Amp./dm², a voltage of 20 V and a temperature of the solution of 60°C. In this metal mold, the shapes of the characters were indistinguishable in the external appearance, and the whole inside of the cavity looked like a uniform plating surface.

When, however, the low-expansion foaming resin employed in Example 4 was injection-molded using the metal mold and under the conditions of Example 4, the characters presented a lustrous ground color of the resin in a whitish foamed pattern and could be clearly read in the molded decoration panel.

What we claim is:

1. In a metal mold for use in injection molding of plastics material, said mold being formed of a base metal as a cavity portion and a core portion engagable with each other to define by their inner surfaces a molding void portion, the improvement which comprises an inner surface section formed of a resin having a thermal conductivity lower than that of said base metal, said section having the surface thereof that faces said molding void portion plated with metal, said surface plated with metal forming at least a part of the molding surface of said metal mold.

2. A metal mold as claimed in claim 1 wherein said resin is selected from the group consisting of epoxy resin, polyethylene terephthalate resin, acrylonitrile-butadiene-styrene resin and phenol-formaldehyde resin.

* * * * *